O. LEHMANN.
ROAD VEHICLE SIGNAL.
APPLICATION FILED MAY 27, 1921.
1,399,778.
Patented Dec. 13, 1921.
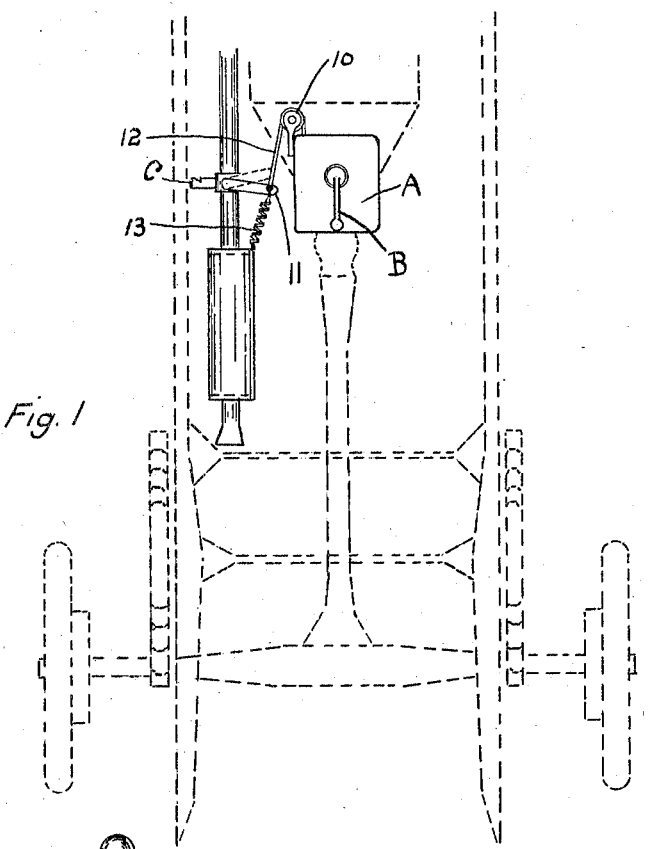
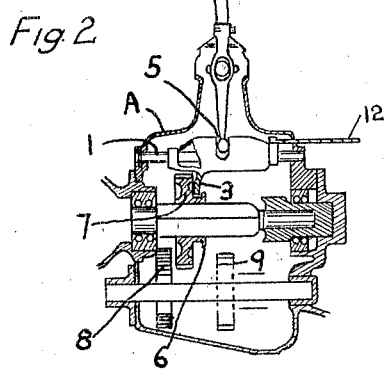
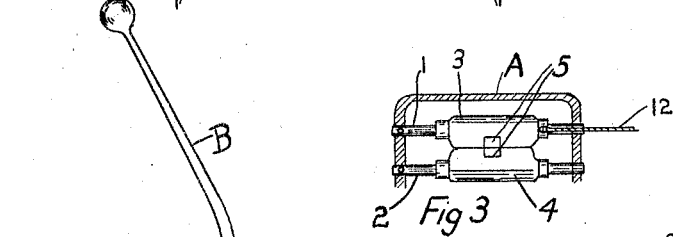
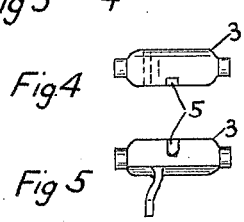
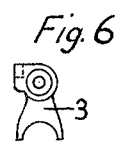
Oscar Lehmann INVENTOR
BY J. M. Thomas
ATTORNEY

UNITED STATES PATENT OFFICE.

OSCAR LEHMANN, OF SALT LAKE CITY, UTAH.

ROAD-VEHICLE SIGNAL.

1,399,778.   Specification of Letters Patent.   Patented Dec. 13, 1921.

Application filed May 27, 1921. Serial No. 473,106.

*To all whom it may concern:*

Be it known that I, OSCAR LEHMANN, a citizen of the United States, residing at Salt Lake City, in the county of Salt Lake and State of Utah, have invented certain new and and useful Improvements in Road-Vehicle Signals, of which the following is a specification.

My invention relates to road vehicle signals, and has for its object to provide an apparatus for attachment on road vehicles, such as automobiles and trucks, which will automatically give an audible signal when the motive power on the vehicle is connected or shifted preparatory to backing the vehicle and which will continue to sound as long as the motive power is connected in the reverse action.

These objects I accomplish with the apparatus illustrated in the accompanying drawings in which similar letters and numerals of reference indicate like parts throughout the several views, and as described in the specification forming a part of this application and pointed out in the appended claims.

In the drawings in which I have shown a substantial embodiment of my invention, Figure 1 is a plan view of the apparatus in place on the chassis of an automobile. Fig. 2 is a vertical section of the transmission case and parts carried therein and showing the reverse mechanism of the automobile in side elevation. Fig. 3 is a plan view of the fork carrying shafts and forks operable thereon with a corner of the transmission case shown in section. Figs. 4, 5 and 6 are respectively a plan, a side view and end elevation of the shifting fork and bearing therefor.

In operating automobiles and trucks it is frequently necessary to back the vehicle at places where injury might occur to persons and animals unless some warning is given of the backward movement in time to avoid the injury, and the operator frequently forgets or fails to give the warning. The present invention automatically gives such warning before and while the vehicle is being moved rearwardly thus avoiding accidents from such rearward movement, and consists of a transmission case A within which two parallel shafts 1 and 2 are fastened. On each of which shafts is carried its respective shifting fork 3 and 4 which forks are moved longitudinally on the shafts to shift the transmission gears. In the bearing portion of each of said shifting forks is cut a transverse slot or recess 5 within which is operated the lower end of the shifting lever B, which is fulcrumed in the upper portion of said case A. The said fork 3 engages with the annular flange 6, which is integrally formed on the gear wheel 7, to mesh the teeth of said gear wheel with the teeth of gears which are parts of the transmission mechanism.

The said fork 3 is thus operatively connected with the low and reverse gears 8 and 9 as desired. When the gear wheel 7 is in mesh with the gear 8 the vehicle will be in reverse position, and the vehicle will move rearwardly when power is applied. On the front end corner of said case A is mounted a sheave wheel or pulley 10, and a signal sounding lever 11 is fulcrumed on the exhaust pipe of the engine, with a cable 12 connecting said lever 11 with the bearing portion of said fork 3 and passed over said sheave 10. A spring 13 is fastened to said lever 11 to normally stop the signal which is sounded by the exhaust from the engine. Any make or style of horn may be used which can be sounded by a portion of the exhaust gases as they pass through the exhaust pipe of the engine.

The operation of by apparatus is as follows:—When the operator desires to run the vehicle backwardly, he throws the shifting lever B to cause its lower end to enter the slot 5, and by then throwing said lever toward the front the said fork 3 and its bearing portion will be moved toward the rear of the case A, and the gear wheel 7 will be brought into mesh with the gear 8, which is the reverse gear. As the fork 3 and its bearing portion is thus moved toward the rear the cable 12 will be moved longitudinally toward the rear, and as said cable is passed over the sheave pulley 10 and in connection with the lever 11, the said lever will be moved on its fulcrum, and the signal valve will be moved to allow some or all of the exhaust gases to pass through and sound the whistle C. The signal will continue to sound as the vehicle is moved toward the rear, and will be discontinued as soon as the lever B is thrown into the neutral, or forward position.

Having thus described my invention and its use, I desire to secure by Letters Patent and claim:—

1. A signal for road vehicles comprising a longitudinally movable shifting fork of the reverse mechanism of an automobile; a lever to move said fork endwise; a sheave pulley mounted adjacent said fork; another lever fulcrumed on and connected with a valve in the exhaust pipe of said vehicle; and a cable fastened at one end to said fork and at its other end to the last mentioned lever.

2. An audible signal for automobiles comprising the movable shifting fork of the reverse mechanism of said automobile; a lever to move said fork longitudinally; an exhaust pipe from the engine; a signal connected with said exhaust pipe; another lever pivoted contiguous said exhaust pipe; a cable operatively connecting said last mentioned lever and said shifting fork to move said lever on its fulcrum when said fork is shifted.

3. A signal for road vehicles comprising a longitudinally movable shifting fork of the reverse mechanism of an automobile; means to move said fork endwise; a sheave pulley mounted adjacent said fork; another lever fulcrumed on and connected with a valve in the exhaust pipe of said vehicle; and a cable fastened at one end to said fork and at its other end to the last mentioned lever.

In testimony whereof I have affixed my signature.

OSCAR LEHMANN.